(12) United States Patent
Lisek

(10) Patent No.: US 9,289,100 B2
(45) Date of Patent: Mar. 22, 2016

(54) COOKING UTENSIL HAVING HANDLE WITH TEXTUAL INFORMATION

(71) Applicant: Samuel A. Lisek, Croswell, MI (US)

(72) Inventor: Samuel A. Lisek, Croswell, MI (US)

( * ) Notice: Subject to any disclaimer, the term of this patent is extended or adjusted under 35 U.S.C. 154(b) by 0 days.

(21) Appl. No.: 14/672,134

(22) Filed: Mar. 28, 2015

(65) Prior Publication Data

US 2015/0272362 A1    Oct. 1, 2015

Related U.S. Application Data

(60) Provisional application No. 61/972,342, filed on Mar. 30, 2014.

(51) Int. Cl.
A47J 43/28    (2006.01)

(52) U.S. Cl.
CPC ..................... A47J 43/288 (2013.01)

(58) Field of Classification Search
USPC ......... 294/7, 8, 24, 26, 137, 140, 25; D7/683, D7/688; 403/21, 22, 19, 301, 322.2
See application file for complete search history.

(56) References Cited

U.S. PATENT DOCUMENTS

| | | | | |
|---|---|---|---|---|
| 1,229,843 A * | 6/1917 | Whitaker | .............. | B23B 31/113 172/375 |
| 1,477,653 A * | 12/1923 | De La Barre | ......... | A47J 43/281 15/236.01 |
| 1,807,279 A * | 5/1931 | Byrnes | ................. | A47G 21/045 279/102 |
| 2,765,190 A * | 10/1956 | McAhren | .............. | A47J 43/288 294/7 |
| 4,332,409 A * | 6/1982 | Stachowicz | ............ | A47J 43/283 294/2 |
| 4,539,751 A * | 9/1985 | Chan | ..................... | A47J 43/283 30/322 |
| 4,924,444 A * | 5/1990 | Castellanos | ........... | B01F 13/002 366/129 |
| 5,272,788 A * | 12/1993 | Gilstrap | ................... | B25G 3/30 16/422 |
| 5,606,761 A * | 3/1997 | Lynch | ................... | A47L 13/022 15/144.4 |
| 5,738,401 A * | 4/1998 | Fan | ........................ | A45F 5/1046 294/137 |
| 5,816,337 A * | 10/1998 | Kun-Chuan | .......... | A01B 1/222 16/422 |
| 6,199,245 B1 * | 3/2001 | Blessing | .................. | B25G 1/06 16/422 |
| 6,623,056 B1 * | 9/2003 | Wickson | ................. | A45F 5/102 294/137 |
| 6,669,397 B1 * | 12/2003 | Christion | ................. | B25G 3/00 15/105 |
| D564,845 S * | 3/2008 | Kavanaugh | ..................... | D4/135 |
| 7,735,416 B2 * | 6/2010 | Ekberg | ................ | A47J 37/0763 126/30 |
| 8,533,896 B2 * | 9/2013 | Lemke | .................... | B60S 3/047 15/236.01 |
| 2008/0127454 A1 * | 6/2008 | Chan | .................... | B67D 1/0872 16/110.1 |
| 2008/0197146 A1 * | 8/2008 | Eyler | .................... | B67D 1/0888 222/39 |
| 2013/0176709 A1 * | 7/2013 | Walker | ................... | B67D 7/145 362/96 |

* cited by examiner

*Primary Examiner* — Paul T Chin
(74) *Attorney, Agent, or Firm* — Buckert Patent & Trademark Law Firm, PC; John F. Buckert

(57) ABSTRACT

A cooking utensil having a metal food holding member, a shaft member, a nut, and a handle is provided. The shaft member has a body portion and a threaded portion. The body portion has a slot therein. The threaded portion extends from the body portion and defines first threads thereon. An end portion of the metal food holding member is received in the slot and is coupled to the body portion. The nut is threadably received on the first threads of the threaded portion. The handle includes internal threads communicating with a first aperture of the handle. The first threads of the threaded portion are threadably received on the internal threads of the handle, such that the nut abuts against the handle and is disposed between the handle and the body portion of the shaft member.

8 Claims, 9 Drawing Sheets

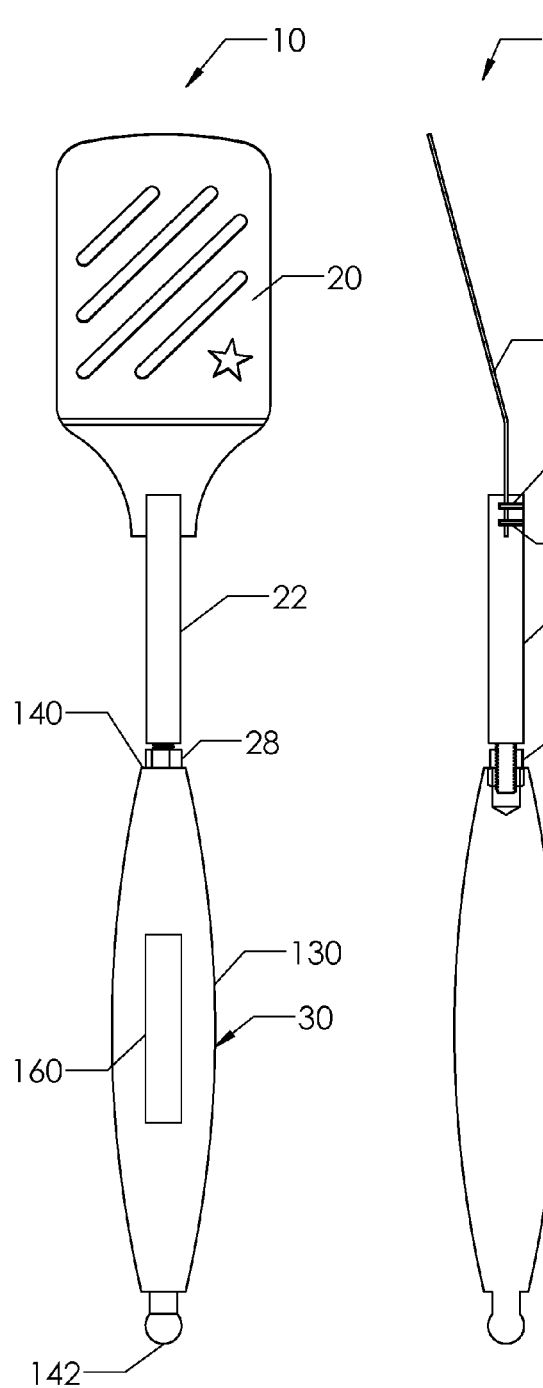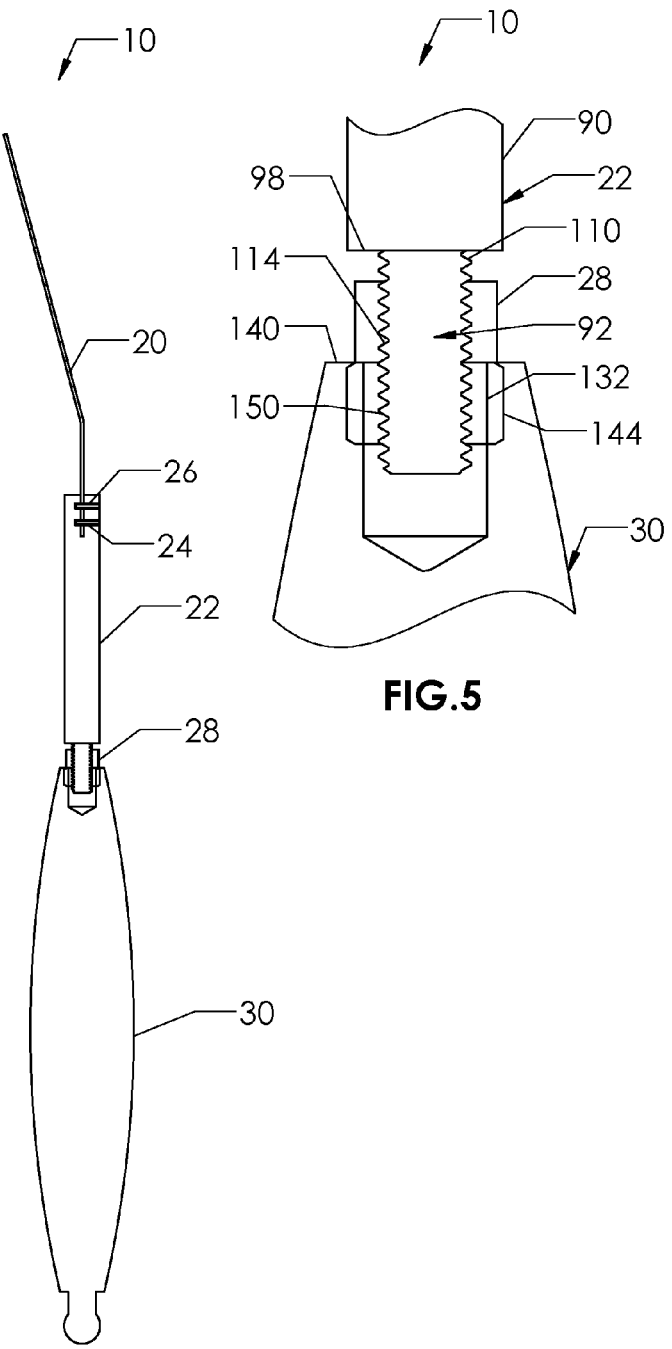

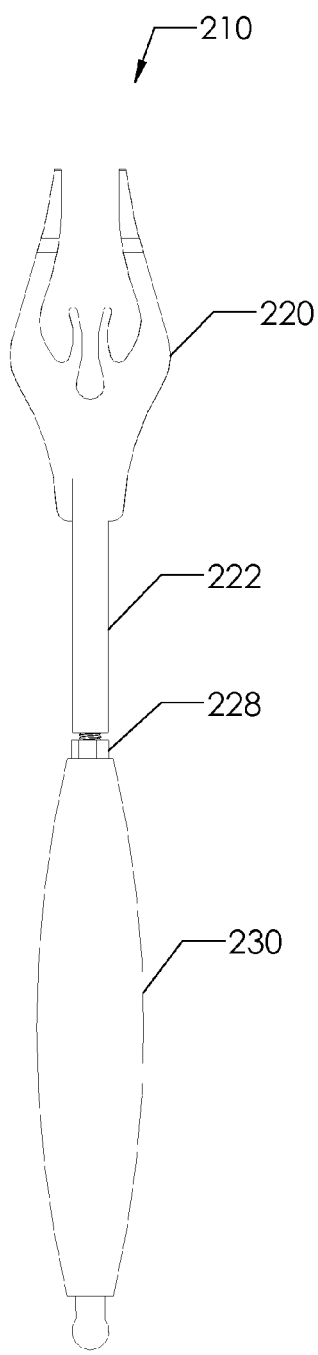
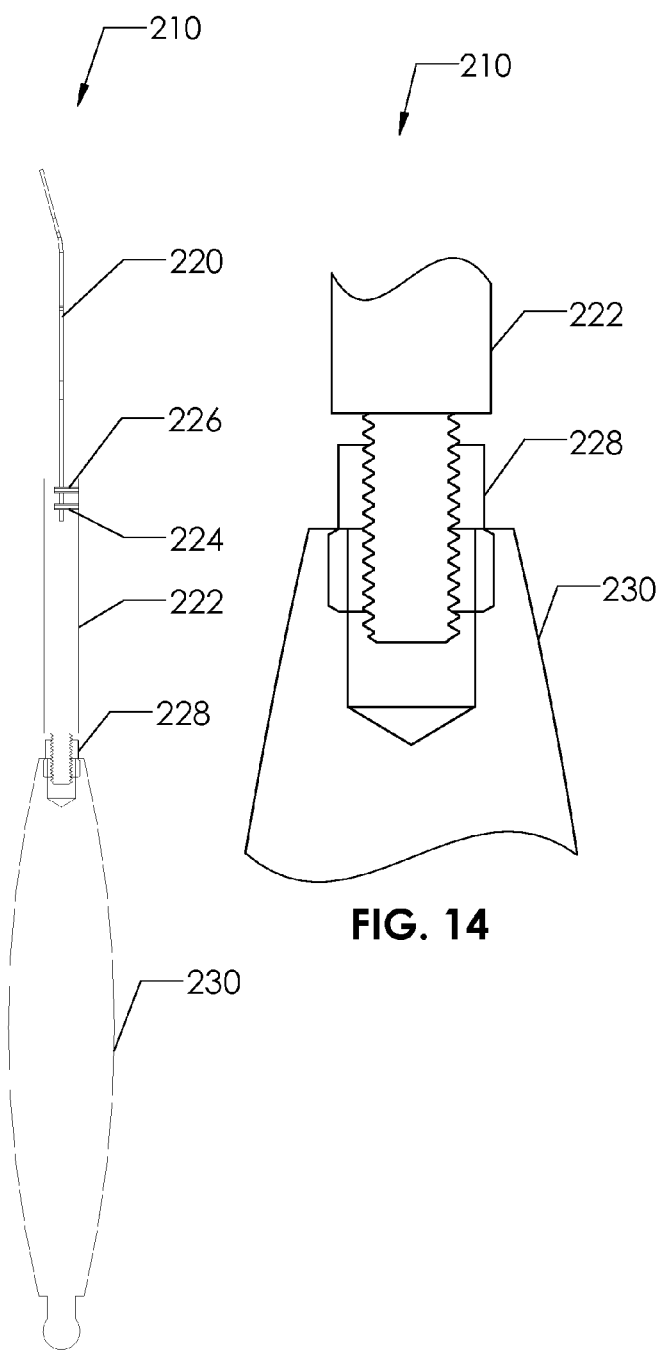
FIG. 12    FIG. 13    FIG. 14

COOKING UTENSIL HAVING HANDLE WITH TEXTUAL INFORMATION

CROSS-REFERENCE TO RELATED APPLICATIONS

This application claims priority to U.S. Provisional Patent Application No. 61/972,342 filed on Mar. 30, 2014, the entire contents of which are hereby incorporated by reference herein.

BACKGROUND

The inventor herein has recognized a need for an improved cooking utensil.

SUMMARY

A cooking utensil in accordance with an exemplary embodiment is provided. The cooking utensil includes a metal food holding member. The cooking utensil further includes a shaft member having a body portion and a threaded portion extending along a longitudinal axis. The body portion has a first end and a second end. The body portion further includes a slot extending from the first end thereof into the body portion. The threaded portion is coupled to and extends from the second end of the body portion. The threaded portion defines first threads thereon. An end portion of the metal food holding member is received in the slot and is coupled to the body portion. The cooking utensil further includes a nut that is threadably received on the first threads of the threaded portion of the shaft member. The cooking utensil further includes a handle having a first end and a second end. The handle further includes a first aperture extending into the first end thereof. The handle further includes internal threads communicating with the first aperture of the handle. The first threads of the threaded portion of the shaft member are threadably received on the internal threads of the handle, such that the nut abuts against the first end of the handle and is disposed between the first end of the handle and the second end of the body portion of the shaft member.

BRIEF DESCRIPTION OF THE DRAWINGS

FIG. 3 is a top view of the cooking utensil of FIG. 1;

FIG. 4 is a cross-sectional view of the cooking utensil of FIG. 1;

FIG. 5 is an enlarged cross-sectional view of a portion of the cooking utensil of FIG. 1 having a nut at a first operational position;

FIG. 12 is a top view of the cooking utensil of FIG. 10;

FIG. 13 is a cross-sectional view of the cooking utensil of FIG. 10;

FIG. 14 is an enlarged cross-sectional view of a portion of the cooking utensil of FIG. 10 having a nut at a first operational position.

DETAILED DESCRIPTION

Figure 1:
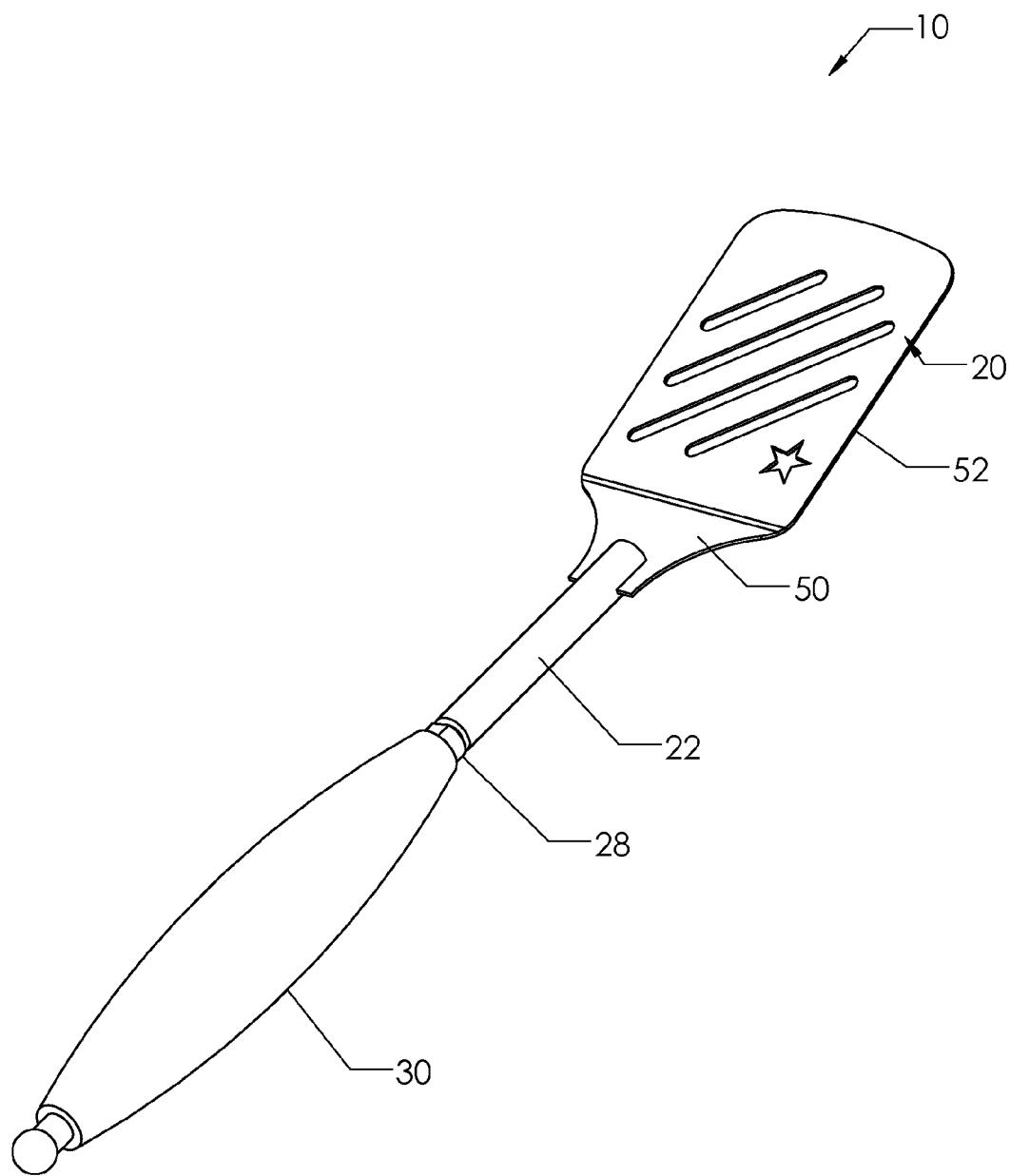
FIG. 1 is a schematic of a cooking utensil in accordance with an exemplary embodiment.

Referring to FIGS. 1-4, a cooking utensil 10 in accordance with an exemplary embodiment is provided. The cooking utensil 10 includes a metal food holding member 20, a shaft member 22, pins 24, 26, a nut 28, and a handle 30. An advantage of the cooking utensil 10 is that the rotational position of the handle 30 on the shaft member 22 can be adjusted utilizing the nut 28 for positioning a region 160 (shown in FIG. 3) of the handle 30 having textual information thereon to a desired position.

Figure 2:
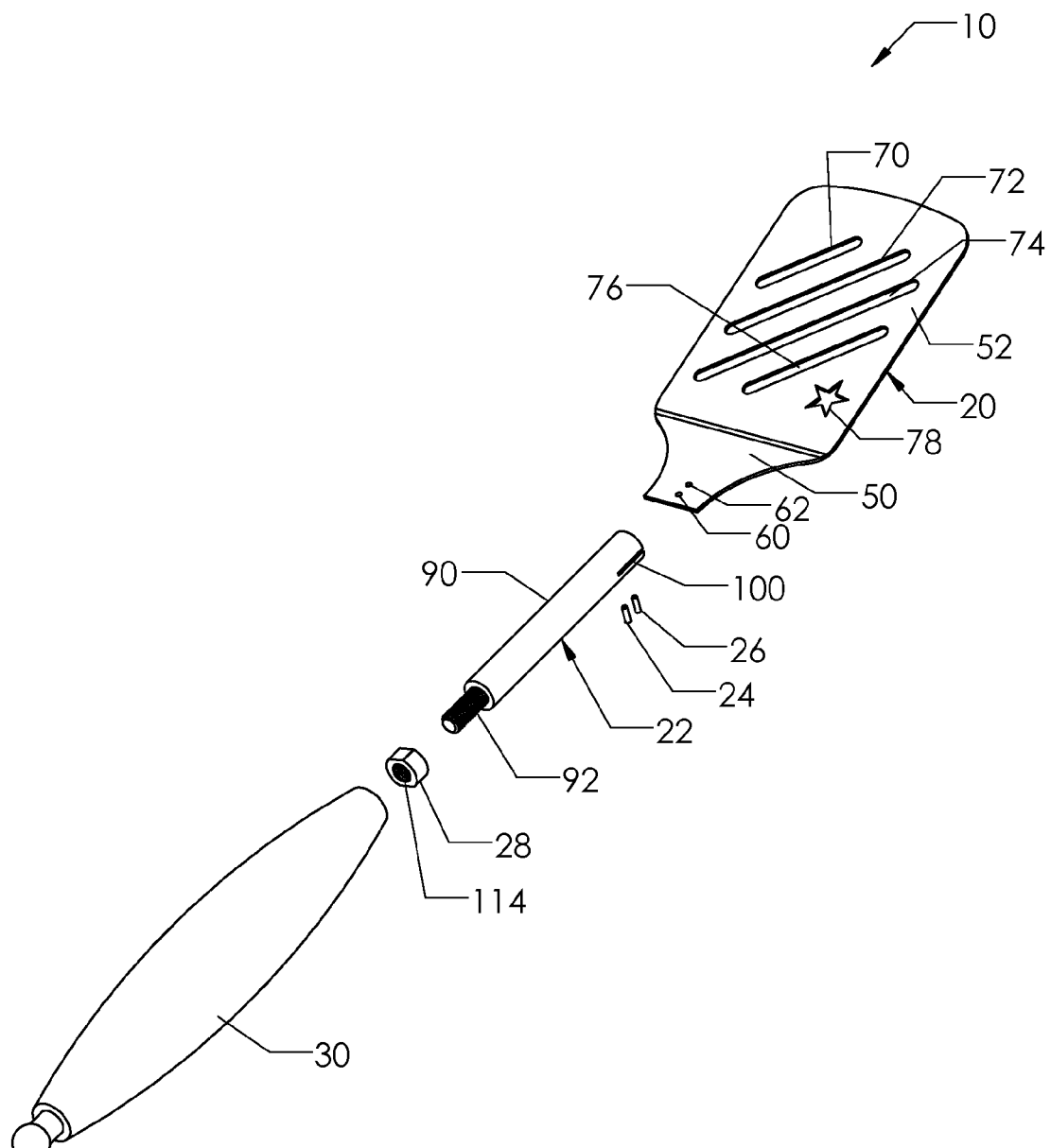
FIG. 2 is an exploded view of the cooking utensil of FIG. 1.

Referring to FIG. 2, in the illustrated embodiment, the metal food holding member 20 comprises a metal spatula member. The metal spatula member 20 includes an end portion 50 coupled to a plate portion 52. The end portion 50 includes apertures 60, 62 extending therethrough for receiving pins 24, 26, respectively, therethrough, for coupling the metal spatula member 20 to the shaft member 22. The plate portion 52 includes elongated apertures 70, 72, 74, 76 and a star shaped aperture 78 extending therethrough for allowing grease to pass therethrough while cooking meat. In an exemplary embodiment, the metal spatula member 20 is constructed of stainless steel. Of course, in an alternative embodiment, the metal spatula member 20 could be constructed of other metals such as aluminum for example. Further, in another alternative embodiment, the food holding member 20 could be constructed of plastic instead of a metal.

Referring to FIGS. 2 and 7-9, the shaft member 22 is configured to be coupled to and between the metal spatula member 20 and the handle 30. In an exemplary embodiment, shaft member 22 is a cylindrical shaft member. Further, in an exemplary embodiment, the shaft member 22 is constructed of aluminum. Of course, in an alternative embodiment, the shaft member 22 could be constructed of other materials such as stainless steel, plastic, or wood for example. Further, in an alternative embodiment, the shaft member 22 could have a different cross-sectional shape such as a hexagonal shape or a rectangular shape for example. The shaft member 20 includes a body portion and a threaded portion 92 extending along a longitudinal axis 106 (shown in FIG. 7). The body portion 90 has a first end 96 and a second end 98. The body portion 90 further includes a slot 100 extending from the first end 96 into the body portion 90. The body portion 90 further includes apertures 102, 104 extending from an outer surface of the body portion 90 into the body portion 90. The threaded portion 92 is coupled to and extends from the second end 98 of the body portion 90. The threaded portion 92 defines external threads 110 thereon. A diameter D1 of the body portion 90 is greater than a diameter D2 of the threaded portion 92.

The end portion 50 of the metal spatula member 20 is received in the slot 100 and is coupled to the shaft member 22. In particular, the apertures 102, 104 in the body portion 90 communicate with the slot 100 and are sized to receive the pins 24, 26, therethrough. The pins 24, 26 extend through the apertures 102, 104, respectively, in the body portion 90 of the shaft member 22 and further extend through the apertures 60, 62, respectively, in the metal spatula member 20 for coupling the shaft member 20 to the metal spatula member 20. In an alternative embodiment, the metal spatula member 20 is received in the slot 100 of the shaft member 22 and is welded to the shaft member 22. Further, in yet another alternative embodiment, the spatula member 20 and the shaft member 22 are constructed of plastic and are integrally formed together.

Figure 6:
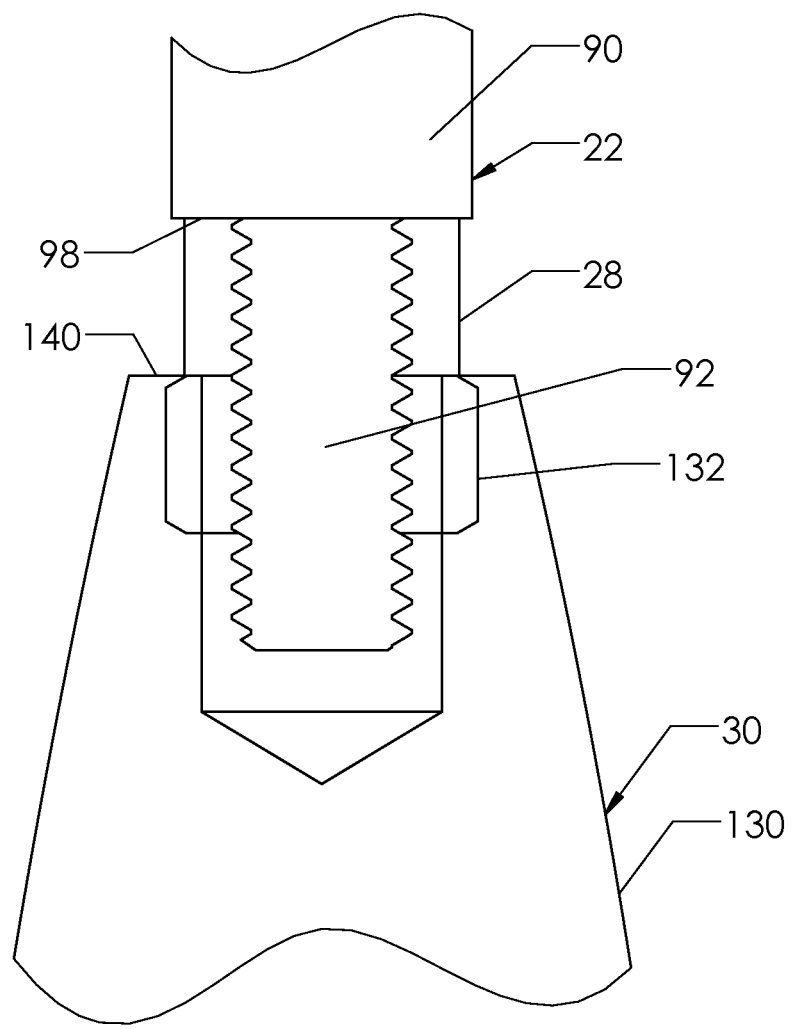
FIG. 6 is another enlarged cross-sectional view of a portion of the cooking utensil of FIG. 1 having the nut at a second operational position.
Figure 7:
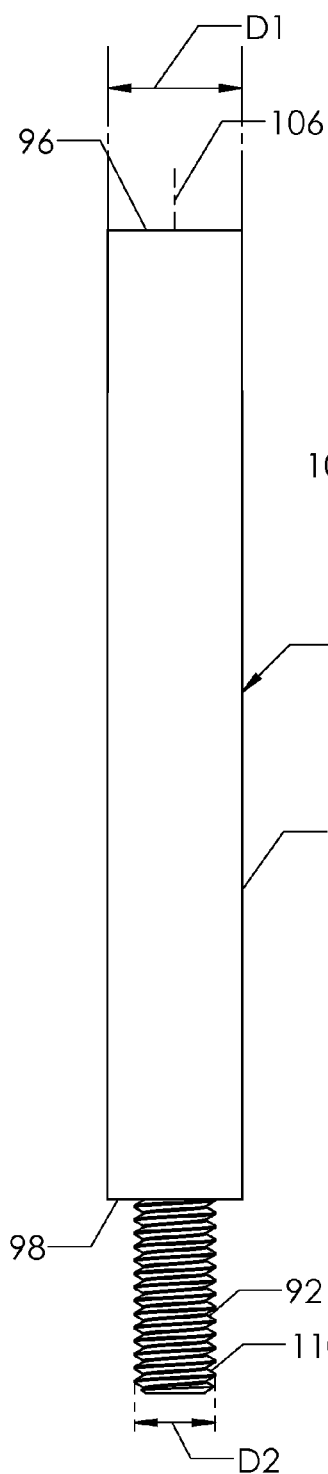
FIG. 7 is a schematic of a shaft member utilized in the cooking utensil of FIG. 1.
Figure 8:
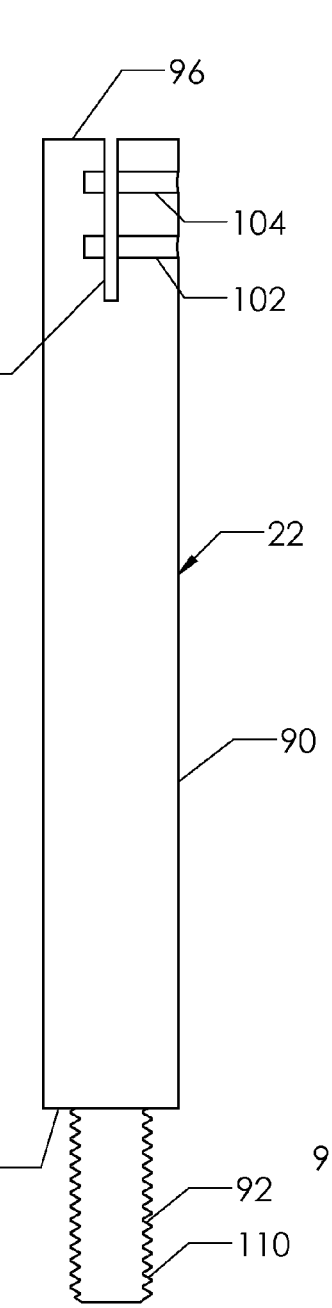
FIG. 8 is a cross-sectional schematic of the shaft member of FIG. 7.
Figure 9:
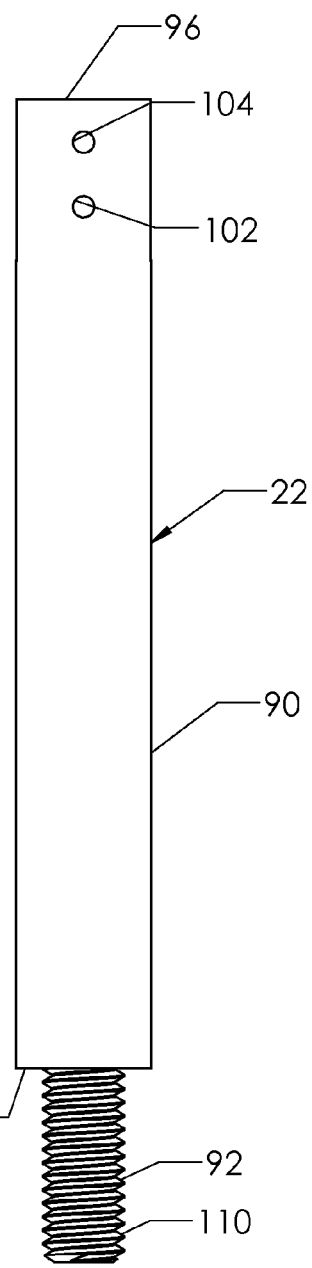
FIG. 9 is another schematic of the shaft member of FIG. 7.
Figure 10:
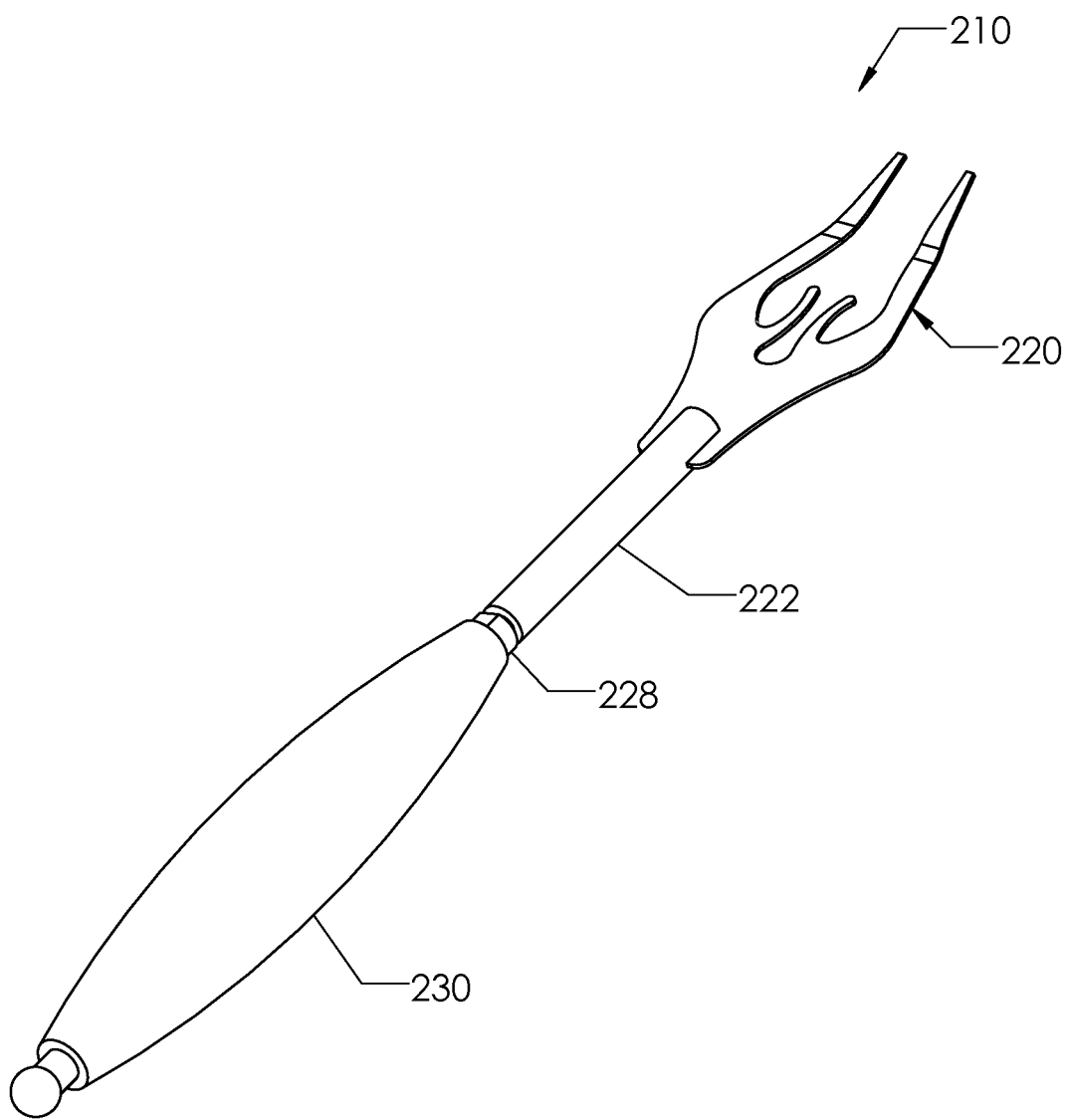
FIG. 10 is a schematic of another cooking utensil in accordance with another exemplary embodiment.

Referring to FIGS. 3-7, the nut 28 is threadably received on the threads 110 of the threaded portion 92 of the shaft member 22. In particular, the nut 28 includes threads 114 (shown in FIG. 2) that are threadably received on the threads 110 of the threaded portion 92. In an exemplary embodiment, the nut 28 is configured to disposed at a first position (shown in FIG. 5) on the threaded portion 92 of the shaft member 22 such that the nut 28 is disposed a desired longitudinal distance away from the second end 98 of the body portion 90 of the shaft member 22, and a portion of the internal nut 132 at the first end 140 of the handle 30 is disposed against the nut 28 such that the region 160 (shown in FIG. 3) on the handle 30 having the textual information thereon is disposed at a desired rotational position relative to the metal spatula member 20, and the handle 30 is held at the desired rotational position by the nut 28 and the internal nut 132. Referring to FIG. 6, in an alternative configuration, the nut 28 is configured to be disposed at a second position (shown in FIG. 6) on the threaded portion 92 of the shaft member 22 such that the nut 28 is disposed against the second end 98 of the body portion 90 of the shaft member 22 and a portion of the internal nut 132 at the first end 140 of the handle 30. In an exemplary embodiment, the nut 22 is constructed of a metal such as steel, stainless steel, or aluminum for example. In an alternative embodiment, the nut 22 can be constructed of another material such as plastic for example.

Referring to FIGS. 3 and 5, the handle 30 includes an elongated body 130 and an internal nut 132. Also, the elongated body 130 has a first end 140 and a second end 142. The elongated body 130 has an aperture 144 aperture extending from the first end 140 into the elongated body 130. The internal nut 132 is disposed in the aperture 144 and defines internal threads 150 therein. The internal threads 150 communicate with an open end of the aperture 144. The shape of the aperture 144 is configured to receive the internal nut 132 and to prevent any rotational movement of the internal nut 132. The threads 110 of the threaded portion 92 of the shaft member 22 are threadably received on the internal threads 150 of the internal nut 132 of the handle 30, such that the nut 28 abuts against the internal nut 132 and the first end 96 of the handle 30, and the nut 38 is disposed between the first end 96 of the handle 30 and the second end 98 of the body portion 90 of the shaft member 22. In an exemplary embodiment, the handle 30 comprises a beer-tap handle. As shown in FIG. 3, the handle 30 has the region 160 having textual information thereon. For example, the region 160 could have a trademark of a beer or liquor company therein.

Referring to FIGS. 10-15, a cooking utensil 210 in accordance with another exemplary embodiment is provided. The cooking utensil 210 includes a metal food holding member 220, a shaft member 222, pins 224, 226, a nut 228, and a handle 230. The primary difference between the cooking utensil 210 and the cooking utensil 10 is that the cooking utensil 210 utilizes the metal food holding member 220 that comprises a metal fork member. Since the structure and operation of the shaft member 222, the pins 224, 226, the nut 228, and the handle 230, are identical to the shaft member 22, the pins 24, 26, the nut 28, and the handle 30, respectively, discussed above, only the structure of the metal fork member 220 will be discussed in detail below.

Figure 11:
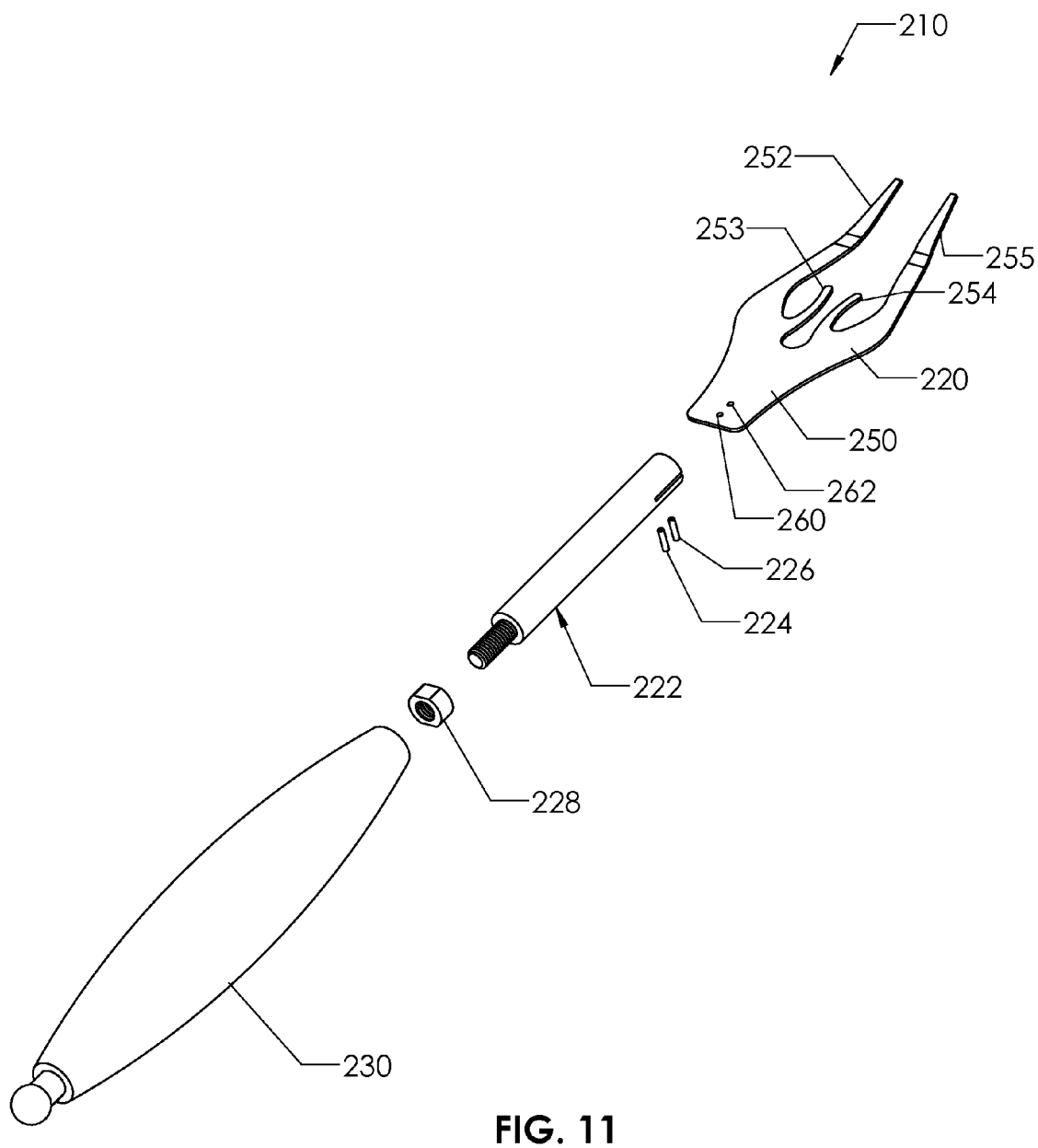
FIG. 11 is an exploded view of the cooking utensil of FIG. 10.
Figure 15:
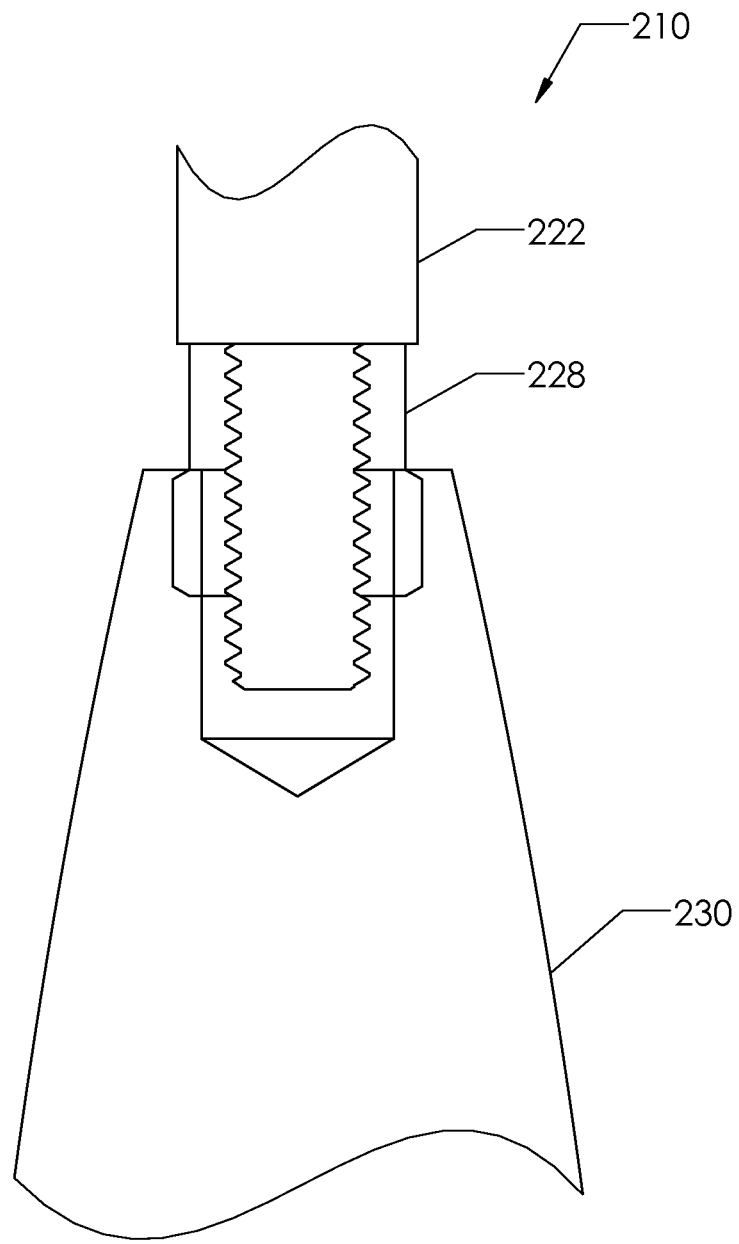
FIG. 15 is another enlarged cross-sectional view of a portion of the cooking utensil of FIG. 10 having the nut at a second operational position.

Referring to FIG. 11, the metal fork member 220 is provided to pierce food for holding food thereon. The metal fork member 220 includes an end portion 250 coupled to the tines 252, 253, 254, 255 which extend generally in a first direction. The length of each of the tines 252, 255 is greater than a length of each of the tines 253, 254. The end portion 250 includes apertures 260, 262 extending therethrough for receiving pins 224, 226, respectively, therethrough, for coupling the metal fork member 220 to the shaft member 222. In an exemplary embodiment, the metal fork member 220 is constructed of stainless steel. Of course, in an alternative embodiment, the metal fork member 220 could be constructed of other metals such as aluminum for example.

The cooking utensils described herein provide a substantial advantage over other cooking utensils. In particular, the cooking utensil utilizes a nut for positioning a region of a handle having textual information thereon to a desired position rotational position. Further, the cooking utensil has another unique feature of utilizing a beer tap handle thereon.

While the claimed invention has been described in detail in connection with only a limited number of embodiments, it should be readily understood that the invention is not limited to such disclosed embodiments. Rather, the claimed invention can be modified to incorporate any number of variations, alterations, substitutions or equivalent arrangements not heretofore described, but which are commensurate with the spirit and scope of the invention. Additionally, while various embodiments of the claimed invention have been described, it is to be understood that aspects of the invention may include only some of the described embodiments. Accordingly, the claimed invention is not to be seen as limited by the foregoing description.

What is claimed is:

1. A cooking utensil, comprising:
a metal food holding member;
a shaft member having a cylindrical-shaped body portion and a threaded portion extending along a longitudinal axis, a diameter of the cylindrical-shaped body portion being greater than a diameter of the threaded portion, the cylindrical-shaped body portion having a first end and a second end, the threaded portion being coupled to and extending from the second end of the cylindrical-shaped body portion, the threaded portion defining first threads thereon, an end portion of the metal food holding member being coupled to the first end of the cylindrical-shaped body portion;
a first nut being threadably received on the first threads of the threaded portion of the shaft member; and
a handle having a first end and a second end, the handle further having a first aperture extending into the first end thereof, the handle further having an internal nut disposed in the first aperture, the internal nut defining internal threads therein, the internal nut having an outer surface coplanar with the first end of the handle, the first threads of the threaded portion of the shaft member being further threadably received on the internal threads of the internal nut; and
the first nut being disposed at a first position on the threaded portion of the shaft member between the first end of the handle and the second end of the cylindrical-shaped body portion of the shaft member such that the first nut is disposed a desired longitudinal distance away from the second end of the cylindrical-shaped body portion of the shaft member, and the first nut is disposed directly on and against the internal nut, and a region of the handle having textual information thereon is at a desired position.

2. The cooking utensil of claim 1, wherein the metal food holding member is one of a metal spatula blade and a metal fork member.

3. The cooking utensil of claim 1, wherein the handle comprises a beer-tap shaped handle.

4. The cooking utensil of claim 3, wherein the beer-tap shaped handle has a region having textual information thereon.

5. The cooking utensil of claim 1, wherein the metal food holding member is constructed of stainless steel, and the shaft member is constructed of aluminum.

6. The cooking utensil of claim 1, wherein the handle further includes an elongated body, the elongated body defining the first end and the second end of the handle.

7. The cooking utensil of claim 1, wherein the internal nut does not extend past the first end of the handle along the longitudinal axis.

8. A cooking utensil, comprising:
a metal food holding member;
a shaft member having a body portion and a threaded portion extending along a longitudinal axis, a diameter of the body portion being greater than a diameter of the threaded portion, the body portion having a first end and a second end, the threaded portion being coupled to and extending from the second end of the body portion, the threaded portion defining first threads thereon, an end portion of the metal food holding member being coupled to the first end of the body portion;
a first nut being threadably received on the first threads of the threaded portion of the shaft member;
a beer-tap shaped handle having a first end and a second end, the beer-tap shaped handle further having a first aperture extending into the first end thereof, the beer-tap shaped handle further having an internal nut disposed in the first aperture, the internal nut defining internal threads therein, the internal nut having an outer surface coplanar with the first end of the beer-tap shaped handle such that the internal nut does not extend past the first end of the beer-tap shaped handle along the longitudinal axis, the first threads of the threaded portion of the shaft member being threadably received on the internal threads of the internal nut; and
the first nut being disposed at a first position on the threaded portion of the shaft member between the first end of the beer-tap shaped handle and the second end of the body portion of the shaft member such that the first nut is disposed a desired longitudinal distance away from the second end of the body portion of the shaft member, and the first nut is disposed directly on and against the internal nut, and a region on the beer-tap shaped handle having textual information thereon is at a desired position.

* * * * *